United States Patent
Watanabe et al.

[11] Patent Number: 5,441,826
[45] Date of Patent: Aug. 15, 1995

[54] HYDROGEN-ABSORBING ALLOY ELECTRODE

[75] Inventors: Hiroshi Watanabe, Hirakata; Akio Furukawa, Osaka; Shin Fujitani, Hirakata; Ikuo Yonezu, Hirakata; Takahiro Isono, Hirakata, all of Japan

[73] Assignee: Sanyo Electric Co., Ltd., Osaka, Japan

[21] Appl. No.: 189,172

[22] Filed: Jan. 31, 1994

[30] Foreign Application Priority Data

Apr. 28, 1993 [JP] Japan .................. 5-125167
Apr. 28, 1993 [JP] Japan .................. 5-125168
Apr. 28, 1993 [JP] Japan .................. 5-125169
Apr. 28, 1993 [JP] Japan .................. 5-125170

[51] Int. Cl.$^6$ ............................... H01M 4/02
[52] U.S. Cl. ........................ 429/101; 429/59; 420/455; 420/580; 420/900
[58] Field of Search .............. 420/900, 580, 455; 429/101, 59, 218

[56] References Cited

U.S. PATENT DOCUMENTS

| | | |
|---|---|---|
| 4,431,561 | 2/1984 | Ovshinsky et al. . |
| 4,551,400 | 11/1985 | Sapru et al. . |
| 4,728,586 | 3/1988 | Venkatesan et al. . |
| 4,923,770 | 5/1990 | Grasselli et al. . |
| 5,104,617 | 4/1992 | Fetcenko et al. .......... 420/588 |
| 5,135,589 | 8/1992 | Fetcenko et al. . |
| 5,149,383 | 9/1992 | Seri et al. ............... 420/900 X |
| 5,268,143 | 12/1993 | Gamo et al. ............. 420/900 X |

FOREIGN PATENT DOCUMENTS

| | | |
|---|---|---|
| 63-291363 | 5/1987 | Japan . |
| 64-48370 | 8/1987 | Japan . |
| 3116655 | 9/1989 | Japan . |
| 2013532 | 8/1979 | United Kingdom . |

*Primary Examiner*—Stephen Kalafut
*Assistant Examiner*—M. Nuzzolillo
*Attorney, Agent, or Firm*—Birch, Stewart, Kolasch & Birch

[57] ABSTRACT

Three types of novel hydrogen-absorbing alloy electrodes A, B and C usable for metal hydride secondary batteries are provided. All three types are represented by the general formula $AB_x$ wherein A represents Ti or elements that principally comprise Ti and generate heat upon absorption of hydrogen, B represents Mo and Ni or elements that principally comprise Mo and Ni and absorb heat upon absorption of hydrogen and $0.5 \leq X \leq 2$, and are readily producible and difficult to undergo cycle deterioration and need only short activation treatment time. (A) uses a hydrogen-absorbing alloy obtained by quenching and solidifying an alloy melt under an atmosphere of a reducing gas containing hydrogen at a cooling rate of at least $1 \times 10^{3°}$ C./sec and having on the surface thereof a hydride layer; (B) uses a hydrogen-absorbing alloy having a composite phase structure comprising a main phase and a subphase, the average areal ratio of said subphase to said main phase in any cross-section of said alloy being 5 to 20%; and (C) uses a hydrogen-absorbing alloy having a composite structure comprising a main phase and subphase, said main phase comprising crystallites having a major axis length (a) of 0.8 to 6 μm and a ratio of the major axis length (a) to minor axis ratio (b), a/b, of not more than 3.

18 Claims, 7 Drawing Sheets

HYDROGEN-ABSORBING ALLOY ELECTRODE

BACKGROUND OF THE INVENTION

This application claims the priority of Japanese Patent Applications Nos. 125167/1993, 125168/1993, 125169/1993 and 125170/1993 filed Apr. 28, 1993, which are incorporated herein by reference.

1. Field of the Invention

The present invention relates to a hydrogen-absorbing alloy electrode and, more specifically an improvement in, electrode materials for the purpose of providing a hydrogen-absorbing alloy electrode that hardly undergoes cycle deterioration, and activates in a short time and is readily producible.

2. Description of the Prior Art

In recent years, there have been highlighted metal hydride secondary batteries with a positive electrode of a metal compound such as nickel hydroxide and a negative electrode utilizing a hydrogen-absorbing alloy, which is a new material. This is because they posses higher energy density per unit weight or unit volume, thus realizing higher capacity, compared with other type batteries such as nickel-cadmium secondary batteries.

Ti-Mo-Ni alloys principally containing Ti, Mo and Ni have been attracting attention as negative electrode material, replacing conventional Mm-Ni alloys, for such metal hydride secondary batteries, since they are particularly advantageous to increase battery capacity. Electrodes utilizing this type of alloy are prepared, like those utilizing conventional alloys such as Mm-Ni alloys, by kneading an alloy powder obtained by pulverizing blocks of the alloy with a conductive agent and a binder, applying the obtained mixture on an electrode support and then drying the mixture.

However, the hydrogen-absorbing alloy electrodes using the Ti-Mo-Ni alloy have had the following problems (1) through (3).

(1) Ti-Mo-Ni alloys have been prepared by solidifying an alloy melt at a relatively slow cooling rate of about 10° to 100° C./sec (the cooling rate differs depending on the alloy type and its preparation process). This cooling rate makes the resulting alloy structure nonuniform, and hence electrodes utilizing the alloy tend to undergo, in the course of charge and discharge cycles, surface corrosion to form a dense inactive surface layer, thereby causing cycle deterioration.

(2) When a hydrogen-absorbing alloy is used as an electrode material, it is a common practice to, after fabrication of batteries therefrom, conduct a few times of charge and discharge preliminarily, in order to activate the electrodes by removing oxide film that has formed on the surface during pulverization of alloy blocks and like occasions (hereinafter this operation is referred to as "activation treatment"). Since most Ti-Mo-Ni alloys are covered with a large amount of oxide film, it takes a long time to complete activation treatment on them.

(3) Ti-Mo-Ni alloys are hard and, at the same time, have high ductility, so that such alloy blocks are very difficult to pulverize.

As a result of an intensive study, the present inventors have come to the following findings.

(I) Increasing the cooling rate during solidification can make uniform the resulting alloy structure. Furthermore, forming a layer of hydride on the surface of a hydrogen-absorbing alloy suppresses oxidation of the hydrogen-absorbing alloy.

(II) While increasing the cooling rate during solidification can make uniform the alloy structure and suppresses cycle deterioration in a considerable degree, an alloy that is still more resistant to cycle deterioration is obtained by forming on this occasion, besides a main phase consisting of a Ti-Mo-Ni crystal phase, a subphase of another crystal phase in a specific ratio.

(III) There exists a close relationship between the size and shape of crystallites constituting a main phase in the structure of a Ti-Mo-Ni hydrogen-absorbing alloy and the cycle life of an electrode using the alloy.

The present invention has been completed based on the above findings, and an object of the invention is to provide a hydrogen-absorbing alloy electrode that undergoes little cycle deterioration.

SUMMARY OF THE INVENTION

The present invention provides a hydrogen-absorbing alloy electrode using an electrode material of a hydrogen-absorbing alloy represented by the general formula $AB_x$ wherein A consists essentially of Ti or a mixture of elements which consists essentially of Ti in combination with Zr, Hf, Nb or Ta and wherein A generates heat upon absorption of hydrogen, B consists essentially of Mo and Ni or a mixture of elements that consist essentially of Mo and Ni in combination with Cr, W, Co or Cu and wherein B absorbs heat upon absorption of hydrogen and $0.5 \leq X \leq 2$, said alloy being obtained by quenching and solidifying an alloy melt under an atmosphere of a reducing gas containing hydrogen at a cooling rate of at least $1 \times 10^{3}$° C./sec and having on the surface thereof a hydride layer. Hereinafter this type hydrogen-absorbing alloy electrode is referred to as "the electrode (A) of the present invention".

The present invention further provides a hydrogen-absorbing alloy electrode using an electrode material of a hydrogen-absorbing alloy being represented by the general formula $AB_x$ wherein A consists essentially of Ti or a mixture of elements which consists essentially of Ti in combination with Zr, Hf, Nb or Ta and wherein A generates heat upon absorption of hydrogen, B consists essentially of Mo and Ni or a mixture of elements that consist essentially of Mo and Ni in combination with Cr, W, Co or Cu and wherein B absorbs heat upon absorption of hydrogen and $0.5 \leq X \leq 2$, said alloy having a composite phase structure comprising a main phase and a subphase, the average areal ratio of said subphase to said main phase in any cross-section being 5 to 20%. Hereinafter this type hydrogen-absorbing alloy electrode is referred to as "the electrode (B) of the present invention".

The present invention still further provides a hydrogen-absorbing alloy electrode using an electrode material of a hydrogen-absorbing alloy being represented by the general formula $AB_x$ wherein A consists essentially of Ti or a mixture of elements which consists essentially of Ti in combination with Zr, Hf, Nb or Ta and wherein A generates heat upon absorption of hydrogen, B consists essentially of Mo and Ni or a mixture of elements that consist essentially of Mo and Ni in combination with Cr, W, Co or Cu and wherein B absorbs heat upon absorption of hydrogen and $0.5 \leq X \leq 2$, and having a composite structure comprising a main phase and a subphase, said main phase comprising crystallites having a major axis length (a) of 0.8 to 6 μm and a ratio of the length (a) of the major axis to the length (b) of minor axis, a/b, of not more than 3. Hereinafter this type hydrogen-absorbing alloy electrode is referred to as "the electrode (C) of the present invention".

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
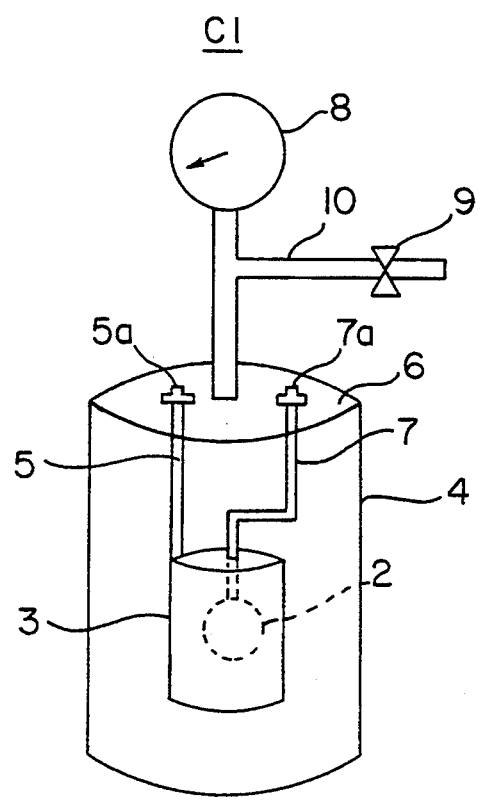
FIG. 1 is a schematic perspective view of the test cell fabricated in Examples.

For the invention of the electrode (A), a cooling rate of at least $1 \times 10^{3°}$ C. is necessary, because otherwise the resulting alloy structure would become nonuniform to cause the alloy to have poor stability. Then in this case the alloy readily undergoes cycle deterioration due to progress of partial dissolution (corrosion) of the alloy structure by formation of local batteries or like causes.

The solidification by melt quenching can be produced by any process with no specific restrictions, but roll method (single roll or dual rolls) is desirable because it gives particles (flakes) having relatively uniform size and necessitates no or almost no pulverization after the solidification.

With this roll method, the cooling rate can be set at a desired level by appropriately adjusting the rotations per minute of the roll. Quenching at a cooling rate of at least $1 \times 10^{3°}$ C./sec can generally give flakes having an average thickness of not more than 30 μm, which can be used as they are, without pulverization, as electrode material. If pulverization is to be conducted as required, it is relatively easily conducted since the ductility of the alloy itself has been decreased due to hydrogen absorption.

The hydride layer of the hydrogen-absorbing alloy used for the electrode (A) of the present invention preferably has an average thickness of 0.01 to 3 μm. With an average thickness of the hydride layer being less than 0.01 μm, formation of oxide film is not sufficiently prevented. Then, it requires longer time to conduct activation treatment after fabrication of battery and, besides, the alloy surface gradually corrodes by the alkali electrolyte solution in the course of repeated charge and discharge cycles and permits an inactive film to form thereon, whereby cycle deterioration readily occurs. On the other hand, with an average thickness of the hydride layer exceeding 3 μm, many cracks generate upon charge and discharge, thereby decreasing resistance to corrosion against the alkaline electrolyte solution so that cycle deterioration readily occurs. The hydride layer having a thickness in the above range is formed by conducting quenching under an atmosphere of a reducing gas such as one containing 1 to 10% by volume of hydrogen. In this case, higher content of hydrogen in the reducing gas used leads to larger thickness of the hydride layer formed.

The hydrogen-absorbing alloy used in the electrode (B) of the present invention can be obtained by, for example, solidifying a melt of a Ti-Mo-Ni alloy having a composition deviating from compositions of single-phase alloys of the same components. It is desirable that the solidification be conducted by quenching at a cooling rate of at least $1 \times 10^{3°}$ C./sec by roll method or like methods. This quenching causes the resulting subphase minute and distributed uniformly all through the alloy, whereby cracks readily form and inactivation of the alloy is effectively prevented.

With the electrode (B) of the present invention, the average areal ratio of the subphase to the main phase in the cross section of the alloy is limited to a range of 5 to 20%, because otherwise the electrode tends to undergo cycle deterioration. If the average areal ratio is less than 5%, the amount of hydrogen supplied into the inside of the alloy will become small due to small area of particle interface between the main phase and subphase. On the other hand, if the average areal ratio exceeds 20%, reaction of the subphase will occur predominantly. By the way, conventional hydrogen-absorbing alloy electrodes have been using hydrogen-absorbing alloys having an average areal ratio of subphase to main phase in their cross-section of less than 5%, generally 1 to 3%.

With the electrode (C) of the present invention, the crystallites of the main phase should have a major axis length (a) of 0.8 to 6 μm. If the length is less than 0.8

μm, the subphase (particle interface phase) will disperse thinly and widely around the crystallites, whereby the function-of the particle interface phase of supplying hydrogen all through the alloy by utilizing a network formed by joining together of adjacent particle interfaces decreases so that the hydrogen supplying speed decreases. On the other hand, if the length exceeds 6 μm, the contact area with particle interface phase per unit volume of main phase will become small so that hydrogen cannot be supplied sufficiently all through the main phase. In both cases, the utility factor of the alloy decreases and the alloy progressively deteriorates partially, thereby deteriorating charge and discharge characteristics.

Further with the electrode (C) of the present invention, the crystallites of the main phase should have a major axis length-to-minor axis length ratio (a/b) of not more than 3. With crystallites having this ratio exceeding 3, cracks generate due to internal stress and the surface newly formed by the crack generation has no particle interface phase, i.e. the generated cracks cut the particle interface there, whereby the amount of hydrogen supplied to the thus cracked and split crystallites decreases and hence cycle deterioration readily occurs. The term "crystallite" herein means a crystal unit, in an alloy crystal, having such a size that the unit can be considered as a single crystal. By the way, there have been used, an example of $MmNi_5$ alloy being given for conventional alloys, ones having an average major axis length (a) of about 10 to 30 μm and a major axis length-to-minor axis length ratio, a/b, of about 3 to about 4.

The hydrogen-absorbing alloys comprising crystallites having a major axis length (a) of 0.8 to 6 μm and a major axis length-to-minor axis length ratio (a/b) of not more than 3 can be obtained, for example, by solidifying an alloy melt having the components of the desired type alloy at a cooling rate of generally at least $1 \times 10^{3°}$ C./sec by roll method.

The electrode (A) of the present invention, utilizing as its electrode material a hydrogen-absorbing alloy obtained by quenching solidification and having uniform alloy structure and excellent resistance to corrosion, hardly undergoes local dissolution upon repetition of charge and discharge cycles (improved cycle characteristics).

Also, with this electrode (A), having a hydride layer formed on its surface, oxide film hardly forms on the surface so that comparatively large amount of hydrogen is absorbed and discharged even at the initial stage of charge (short activation treatment time). Besides, since the hydride layer protects the alloy surface, no inactive layer can readily form thereon even upon repeated charge and discharge cycles (improved cycle characteristics).

In addition, use of the hydrogen-absorbing alloy, having absorbed hydrogen to decrease ductility, realizes, when the alloy is pulverized for preparing electrodes, ready pulverization (easy manufacturing operation).

With the electrode (B) of the present invention, using a Ti-Mo-Ni alloy, having a composite phase structure consisting of a main phase and a specific amount (average areal ratio to main phase in the alloy cross-section of 5 to 20%) of a subphase, the crystal lattices of the main phase and subphase differ, upon charge and discharge, i.e. upon absorption and discharging of hydrogen, from each other in the degree of swelling and shrinking and in the direction thereof. Consequently, internal stress generates to form cracks, which increases the area for reaction with the electrolyte solution used, thereby increasing the amount of hydrogen supplied into the inside of the alloy. Besides, absorption and discharging of hydrogen inside the alloy through particle interfaces is facilitated, whereby the entire alloy can become usable as an electrode material so that the electrode becomes more difficult to undergo cycle deterioration compared with electrodes using conventional alloys with the same composition in which central part of the alloys are not utilized for absorbing and discharging hydrogen.

With the electrode (C) of the present invention, using a Ti-Mo-Ni alloy with its main phase constituted by crystallites having a specific major axis length (a) of 0.8 to 6 μm, sufficient amount of hydrogen can be supplied to the whole crystallites constituting the main phase even upon repetition of charge and discharge cycles. In addition, since the shape of the crystallites, the major axis length-to-minor axis length (a/b) being not more than 3, renders it more difficult to generate internal stress compared with conventional alloys. As a result, even upon repeated charge and discharge cycles cracks hardly generate in the alloy, so that the amount of hydrogen supplied to the main phase hardly decreases.

Other features of the invention will become apparent in the course of the following descriptions of exemplary embodiments which are given for illustration of the invention and are not intended to be limiting thereof.

EXAMPLES

Preparation of the electrodes (A) of the present invention and comparison electrodes

Preparations Examples 1 through 3

Alloy component metals of Ti, Ni and Mo (each commercially available simple metal substance having a purity of at least 99.9%) were mixed together in a molar ratio of 2:1:1. The obtained mixture was placed in a copper crucible in an arc furnace. The inside of the furnace was replaced by an inert gas (argon) and then the mixture was melted by heating. The melt was then quenched by a single-roll method under an atmosphere of an reducing gas containing 5 parts by volume of hydrogen and 95 parts by volume of argon and thus containing 5% by volume of hydrogen, at a cooling rate of $1 \times 10^3$, $\times 10^4$ or $1 \times 10^{5°}$ C./sec, to give flake-shaped hydrogen-absorbing alloys having a composition formula of $TiNi_{0.5}Mo_{0.5}$ and average thicknesses of 22 μm, 17 μm and 15 μm, respectively. The thickness data are averages of measurements on 10 samples (hereinafter the same will apply). The hydride layers formed on the surface of the hydrogen-absorbing alloys all had an average thickness of 0.4 μm.

Then, alloy pastes were prepared by mixing 1 g of each of the hydrogen-absorbing alloys obtained above with 0.2 g of polytetrafluoroethylene (PTFE) as a binder and 1.2 g of nickel powder as a conductive agent, and rolling the obtained mixture.

A prescribed amount each of the alloy pastes was wrapped in a nickel mesh, and the wraps were pressed into disc-shaped paste electrodes, PE1 through PE3, having a diameter of 20 mm.

Preparation Examples 4 through 7

Preparation Example 1 was repeated except that the cooling rate was set at $1 \times 10^{3°}$ C./sec and the hydrogen content in the atmosphere was changed to 1% by volume, 2% by volume, 10% by volume or 15% by volume, to obtain flake-shaped hydrogen-absorbing alloys represented by composition formula $TiNi_{0.5}Mo_{0.5}$, which were then processed in the same manner as in Preparation Example 1 into paste electrodes PE4 through PE7. The average thicknesses of the hydrogen-absorbing alloys were 23 μm, 22 μm, 24 μm and 22 μm in the above order; and the average thicknesses of their hydride layers were 0.005 μm, 0.2 μm, 3.2 μm and 5.6 μm in the above order.

Comparative Preparation Example 1

Preparation Example 1 was repeated except that the cooling rate was set at $1 \times 10_2°$ C., to obtain a flake-shaped hydrogen-absorbing alloy represented by composition formula $TiNi_{0.5}Mo_{0.5}$, which was then processed in the same manner as in Preparation Example 1 into a paste electrode CPE1. The average thickness of the hydrogen-absorbing alloy and that of its hydride layer were 630 μm and 0.4 μm, respectively.

Comparative Preparation Examples 2 through 5

Preparation Example 1 was repeated except that solidifaction was conducted under an atmosphere of argon at a cooling rate of $1 \times 10^2$, $1 \times 10^3$, $1 \times 10^4$ or $1 \times 10^5°$ C./sec, to obtain 4 types of flake-shaped hydrogen-absorbing alloys represented by composition formula $TiNi_{0.5}Mo_{0.5}$, which were then processed in the same manner as in Preparation Example 1 into comparison paste electrodes CPE2 through CPE5. The average thicknesses of the hydrogen-absorbing alloys were 628 μm, 23 μm, 17 μm and 14 μm in the above order.

Fabrication of test cells

The above paste electrodes PE1 through 7 and the comparison paste electrodes CPE1 through CPE5 were used and test cells C1 through C7 and comparison test cells CC1 through CC5 were prepared correspondingly.

FIG. 1 is a schematic perspective view of test cell C1 (other cells also have the same structure). In the FIG., test cell C1 comprises a disc-shaped paste electrode (PE1) 2, a cylindrical sintered nickel electrode 3 and an insulating closed container 4.

The sintered nickel electrode 3 is held by a positive electrode lead 5 connected to the upper surface 6 of the closed container 4. The paste electrode 2 is held such that it is vertically positioned near the center of the hollow cylinder of the sintered nickel electrode 3, by a negative electrode lead 7 connected to the upper surface 6 of the closed container 4.

The end each of the positive electrode lead 5 and negative electrode 7 are, penetrating the upper surface 6 of the closed container 4, exposed outwardly and connected to a positive electrode terminal 5a and negative electrode terminal 7a, respectively.

The paste electrode 2 and the sintered nickel electrode 3 are immersed in an alkaline electrolyte solution (aqueous 30% by weight potassium hydroxide solution; not shown) contained in the closed container 4. The space above the alkaline electrolyte solution is filled with nitrogen so that a prescribed pressure is applied to the paste electrode 2.

On a central part of the upper surface 6 of the closed container 4, there is mounted a relief pipe 10 equipped with a pressure gauge 8 and a relief valve 9.

With respect to the hydrogen-absorbing alloys used for the test cells, Table 1 shows hydrogen contents in reducing gas, cooling rates, average thicknesses of alloys and average thicknesses of hydride layers. Table 2 shows the major axis lengths of crystallites constituting the main phase of the alloys and the major axis length-to-minor axis length ratios.

TABLE 1

| Cell | Hydrogen content (% by volume) | Cooling rate (°C./sec) | Average thickness, of alloy (μm) | Average thickness of alloy hydride layer (μm) |
|---|---|---|---|---|
| C1 | 5 | $1 \times 10^3$ | 22 | 0.4 |
| C2 | 5 | $1 \times 10^4$ | 17 | 0.4 |
| C3 | 5 | $1 \times 10^5$ | 15 | 0.4 |
| C4 | 1 | $1 \times 10^3$ | 23 | 0.005 |
| C5 | 2 | $1 \times 10^3$ | 22 | 0.2 |
| C6 | 10 | $1 \times 10^3$ | 24 | 3.2 |
| C7 | 15 | $1 \times 10^3$ | 22 | 5.6 |
| CC1 | 5 | $1 \times 10^2$ | 630 | 0.4 |
| CC2 | 0 | $1 \times 10^2$ | 628 | 0 |
| CC3 | 0 | $1 \times 10^3$ | 23 | 0 |
| CC4 | 0 | $1 \times 10^4$ | 17 | 0 |
| CC5 | 0 | $1 \times 10^5$ | 14 | 0 |

TABLE 2

| Cell | Major axis length of crystallites constituting main phase (μm); (average) | Ratio of major axis length to minor axis length of crystallites constituting main phase; (average) |
|---|---|---|
| C1 | 3.7 to 5.4 (4.4) | 1.5 to 2.3 (2.0) |
| C2 | 1.1 to 1.9 (1.5) | 1.2 to 1.8 (1.5) |
| C3 | 0.9 to 1.2 (1.0) | 1.2 to 1.5 (1.4) |
| C4 | 3.7 to 5.3 (4.6) | 1.3 to 2.4 (1.9) |
| C5 | 3.7 to 5.2 (4.6) | 1.7 to 2.3 (2.0) |
| C6 | 3.5 to 5.3 (4.5) | 1.6 to 2.6 (2.1) |
| C7 | 3.6 to 5.2 (4.5) | 1.7 to 2.4 (1.9) |
| CC1 | 26 to 39 (32) | 2.1 to 3.3 (3.1) |
| CC2 | 22 to 45 (30) | 1.6 to 3.7 (3.2) |
| CC3 | 3.5 to 5.5 (4.5) | 1.4 to 2.5 (1.9) |
| CC4 | 1.1 to 2.0 (1.5) | 1.1 to 1.8 (1.5) |
| CC5 | 0.8 to 1.2 (1.0) | 1.1 to 1.6 (1.4) |

Relationship between the cooling rate and atmosphere during solidification and the cycle characteristics The cycle life of test cells C1 through C3 and comparison test cells CC1 through CC5 were measured to study the relationship between the cooling rate and atmosphere composition during solidification and the cycle life. Each of the test cells was subjected to a charge-discharge cycle test, in which one cycle consisting of charge at room temperature (25° C.) and 30 mA/g for 8 hours and, after 1-hour pause, discharge at 30 mA/g to a discharge termination voltage of 1.0 V, followed by 1-hour pause. The number (times) of cycles by which the capacity decreases to 50% of the initial capacity was taken as the cycle life.

Figure 2:
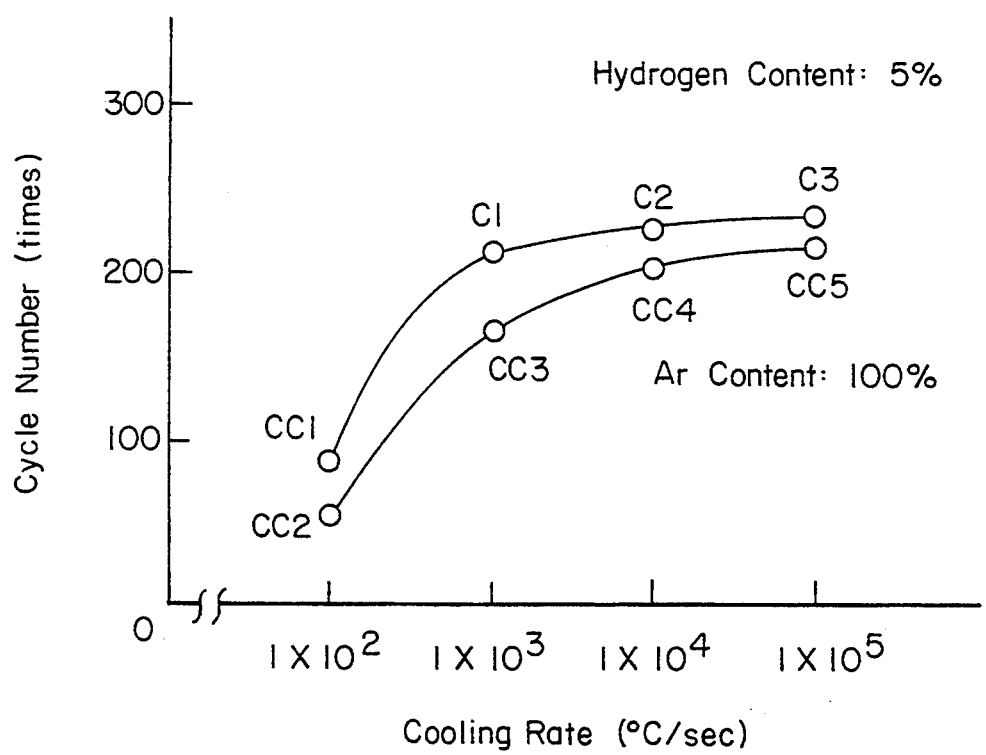
FIG. 2 is a graph showing the relationship between the cooling rate and atmosphere during solidification and the cycle characteristics.

FIG. 2 is a graph showing the relationship between the cooling rate and atmosphere during solidification and the cycle life, with the ordinate representing the cycle number (times) and the abscissa the cooling rate (°C./sec) of hydrogen-absorbing alloys used for the test cells. It is understood from the Figure that test cells C1 through C3 and comparison test cell CC1, with electrodes using alloys obtained by solidifying alloy melts under a reducing atmosphere, have longer cycle lives than those of comparison test cells CC2 through CC5 with electrodes using alloys obtained by solidifying under an atmosphere of argon at the same cooling rates. This fact shows that formation of a hydride layer contributes greatly to prolongation of cycle life. Besides, comparison of test cells C1 through C3 with comparison test cell CC1 shows that at least $1 \times 10^3°$ C./sec is necessary for obtaining a long-life cell of at least 200 cycles.

Relationship between the hydrogen content in reducing gas and the cycle life

Test cells C4 through C7 were tested for cycle life in the same manner as above to study the relationship between the hydrogen content in the reducing gas used and the cycle life.

Figure 3:
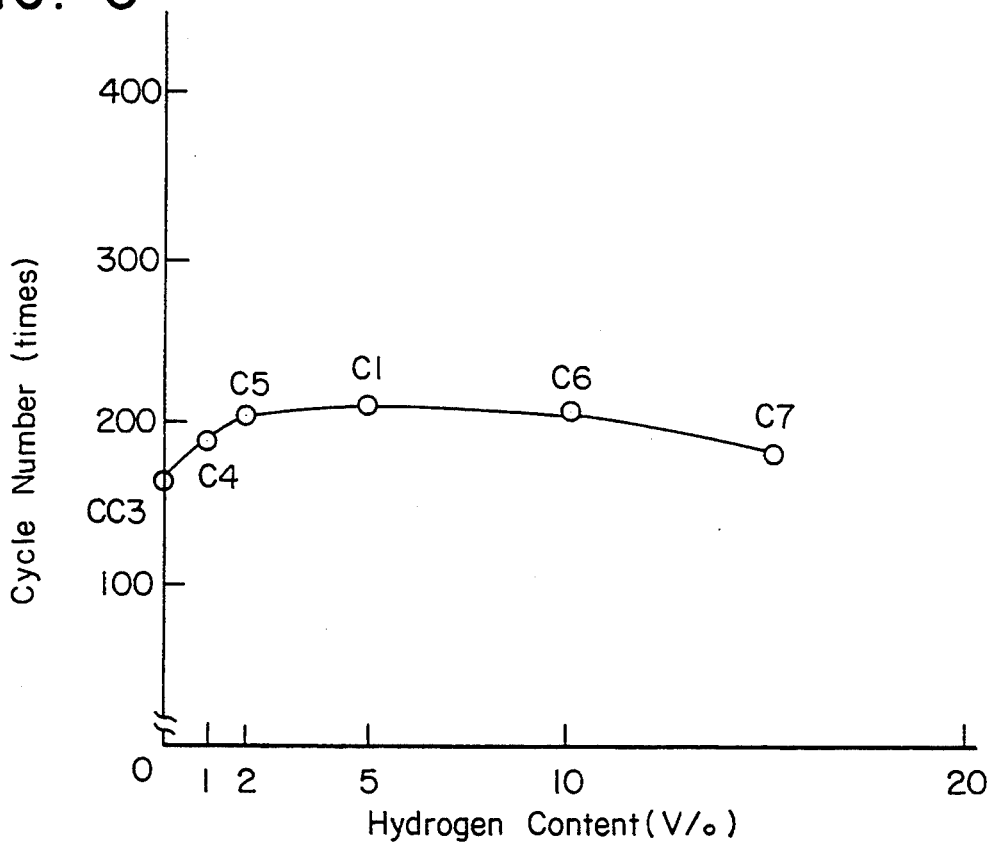
FIG. 3 is a graph showing the relationship between the hydrogen content in reducing gas and the cycle characteristics.

FIG. 3 is a graph showing the relationship between the hydrogen content in reducing gas and the cycle life, with the ordinate representing cycle number (times) and the abscissa the hydrogen content (%). The Figure also shows the cycle lives measured above of test cell C1 and comparison test cell CC3. It is understood from the Figure that the thickness of the hydride layer is desirably in a range of 0.01 to 3 $\mu$m in order to obtain a hydrogen-absorbing alloy electrode that hardly undergoes cycle deterioration.

While explanation is made in the above Preparation Examples 1 through 7, giving examples of the electrodes of the present invention being used for negative electrodes of nickel hydride secondary batteries, the electrodes of the present invention are widely usable for metal hydride secondary batteries in general.

Also, while an example as a hydrogen-absorbing alloy of Ti-Mo-Ni 3-element alloy is explained, the present invention is applicable to hydrogen-absorbing alloy electrodes using alloys principally comprising these metals as electrode materials.

Likewise, while an arc melting furnace was used in the Examples as heating means for obtaining alloy melts, high-frequency induction heating furnace can also be used.

Preparation of the electrodes (B) of the present invention and comparison electrodes Preparation Example 8

A prescribed amount each of alloy component metals of Ti, Ni and Mo (each commercially available simple metal substance having a purity of at least 99.9%) was weighed and mixed together. The obtained mixture was placed in a copper crucible in an arc furnace with an atmosphere of an inert gas (argon) and melted by heating. The melt was then quenched by a single-roll method at a cooling rate of $1 \times 10^{3}$° C./sec, to give flake-shaped hydrogen-absorbing alloys having a composition formula of $TiNi_{0.5}Mo_{0.6}$. The hydrogen-absorbing alloy was analyzed for crystal structure by X-ray diffractometry and EPMA (electron probe microanalysis) on the alloy cross-section, to prove that it had a composite phase structure comprising a main phase with bcc (i.e., body-centered cubic) crystal structure and a subphase with bcc crystal structure.

The above hydrogen-absorbing alloy was also tested by EPMA for the areal ratio in the cross-section of the subphase to the main phase, which was found to be 5%. This ratio value was an average of 10 measurements conducted on 10 square spots having a size of 30 $\mu$m $\times$ 30 $\mu$m selected at random from an optional cross-section of the alloy (hereinafter the same test procedure was followed for measuring areal ratio of subphase).

Then, an alloy paste was prepared by mixing 1 g of the hydrogen-absorbing alloy thus obtained with 0.2 g of polytetrafluoroethylene (PTFE) as a binder and 1.2 g of nickel powder as a conductive agent, and rolling the obtained mixture.

A prescribed amount of the alloy paste was wrapped in a nickel mesh, and the wrap was pressed into a disc-shaped paste electrode PE8 having a diameter of 20 mm.

Preparation Example 9

Preparation Example 8 was repeated except that the mixing ratio of component metals of Ti, Ni and Mo was changed, to obtain a hydrogen-absorbing alloy represented by composition formula $Ti_{1.2}Ni_{0.5}Mo_{0.5}$, which was then processed into a paste electrode PE9 in the same manner. For this hydrogen-absorbing alloy, the areal ratio in the cross-section of subphase to main phase was 10%. The alloy had a crystal structure comprising a main phase having bcc crystal structure, a subphase having bcc crystal structure and a subphase having hcp crystal structure.

Preparation Example 10

Preparation Example 8 was repeated except that the mixing ratio of component metals of Ti, Ni and Mo was changed, to obtain a hydrogen-absorbing alloy represented by composition formula $TiNi_{0.4}Mo_{0.7}$, which was then processed into a paste electrode PE10 in the same manner. For this hydrogen-absorbing alloy, the areal ratio in the cross-section of subphase to main phase was 14%. The alloy had a crystal structure comprising a main phase having bcc crystal structure and a subphase having bcc crystal structure.

Preparation Example 11

Preparation Example 8 was repeated except that the mixing ratio of component metals of Ti, Ni and Mo was changed, to obtain a hydrogen-absorbing alloy represented by composition formula $TiNi_{0.3}Mo_{0.4}$, which was then processed into a paste electrode PE11 in the same manner. For this hydrogen-absorbing alloy, the areal ratio in the cross-section of subphase to main phase was 18%. The alloy had a crystal structure comprising a main phase having bcc crystal structure, a subphase having bcc crystal structure and a subphase having hcp crystal structure.

Comparative Preparation Example 6

Preparation Example 8 was repeated except that the mixing ratio of component metals of Ti, Ni and Mo was changed, to obtain a hydrogen-absorbing alloy represented by composition formula $Ti_{1.2}Ni_{0.5}Mo_{0.4}$, which was then processed into a comparison paste electrode CPE6 in the same manner. For this hydrogen-absorbing alloy, the areal ratio in the cross-section of subphase to main phase was 22%. The alloy had a crystal structure comprising a main phase having bcc crystal structure and a subphase having bcc crystal structure.

Comparative Preparation Example 7

Preparation Example 8 was repeated except that the mixing ratio of component metals of Ti, Ni and Mo was changed and that the cooling rate was changed to $1 \times 10^{2}$° C./sec, to obtain a hydrogen-absorbing alloy represented by composition formula $TiNi_{0.5}Mo_{0.7}$, which was then processed into comparison paste electrode CPE7 in the same manner. For this hydrogen-absorbing alloy, the areal ratio in the cross-section of subphase to main phase was 28%. The alloy had a crystal structure comprising a main phase having bcc crystal structure and a subphase having bcc crystal structure.

Comparative Preparation Example 8

Preparation Example 8 was repeated except that the mixing ratio of component metals of Ti, Ni and Mo was changed and that the cooling rate was changed to $1 \times 10^{2\circ}$ C./sec, to obtain a hydrogen-absorbing alloy represented by composition formula $TiNi_{0.4}Mo_{0.7}$, which was then processed into a comparison paste electrode CPE8 in the same manner. For this hydrogen-absorbing alloy, the areal ratio in the cross-section of subphase to main phase was 34%. The alloy had a crystal structure comprising a main phase having bcc crystal structure, a subphase having bcc structure and a subphase having hcp crystal structure.

Comparative Preparation Example 9

Preparation Example 8 was repeated except that the mixing ratio of component metals of Ti, Ni and Mo was changed, to obtain a hydrogen-absorbing alloy represented by composition formula $TiNi_{0.4}Mo_{0.8}$, which was then processed into a comparison paste electrode CPE9 in the same manner. For this hydrogen-absorbing alloy, the areal ratio in the cross-section of subphase to main phase was 23%. The alloy had a crystal structure comprising a main phase having bcc crystal structure and a subphase having bcc crystal structure.

Comparative Preparation Example 10

Preparation Example 8 was repeated except that a melt of equimolar amounts of Ti and Ni was solidified at a cooling rate of $1 \times 10^{3\circ}$ C./sec, to obtain a hydrogen-absorbing alloy represented by composition formula TiNi, which was then processed into a comparison paste electrode CPE10 in the same manner. For this hydrogen-absorbing alloy, the areal ratio in the cross-section of subphase to main phase was 2%. The alloy had a crystal structure comprising a main phase having bcc crystal structure, a subphase having bcc crystal structure and a subphase having hcp crystal structure.

Comparative Preparation Example 11

Preparation Example 8 was repeated except that a melt of equimolar amounts of Ti and Mo was solidified at a cooling rate of $1 \times 10^{3\circ}$ C./sec, to obtain a hydrogen-absorbing alloy represented by composition formula TiMo, which was then processed into a comparison paste electrode CPE11 in the same manner. For this hydrogen-absorbing alloy, the areal ratio in the cross-section of subphase to main phase was 4%. The alloy had a crystal structure comprising a main phase having bcc crystal structure, a subphase having bcc crystal structure and a subphase having bcc crystal structure.

Comparative Preparation Example 12

Preparation Example 8 was repeated except that a melt of equimolar amounts of Ni and Mo was solidified at a cooling rate of $1 \times 10^{3\circ}$ C./sec, to obtain a hydrogen-absorbing alloy represented by composition formula NiMo, which was then processed into a comparison paste electrode CPE12 in the same manner. For this hydrogen-absorbing alloy, the areal ratio in the cross-section of subphase to main phase was 7%. The alloy had a crystal structure comprising a main phase having bcc crystal structure and a subphase having bcc crystal structure.

Fabrication of test cells

The above paste electrodes PE8 through PE11 and the comparison paste electrodes CPE6 through CPE12 were used and test cells C8 through C11 and comparison test cells CC6 through CC12 were prepared correspondingly. Table 3 shows, for the hydrogen-absorbing alloys used for the test cells, their alloy compositions, main phase structures, subphase structures and average areal ratios of subphase to main phase in the alloy cross-section.

TABLE 3

| Test cell | Alloy composition | Main phase structure | Sub-phase structure | Areal ratio of subphase (%) | Cycle life (times) |
| --- | --- | --- | --- | --- | --- |
| C8 | $TiNi_{0.5}Mo_{0.6}$ | bcc | bcc | 5 | 160 |
| C9 | $Ti_{1.2}Ni_{0.5}Mo_{0.5}$ | bcc | bcc, hcp | 10 | 175 |
| C10 | $TiNi_{0.4}Mo_{0.7}$ | bcc | bcc | 14 | 175 |
| C11 | $TiNi_{0.3}Mo_{0.4}$ | bcc | bcc, hcp | 18 | 165 |
| CC6 | $Ti_{1.2}Ni_{0.5}Mo_{0.4}$ | bcc | bcc | 22 | 145 |
| CC7 | $TiNi_{0.5}Mo_{0.7}$ | bcc | bcc | 28 | 125 |
| CC8 | $TiNi_{0.4}Mo_{0.7}$ | bcc | bcc, hcp | 34 | 90 |
| CC9 | $TiNi_{0.4}Mo_{0.8}$ | bcc | bcc | 23 | 145 |
| CC10 | TiNi | bcc | bcc, hcp | 2 | 55 |
| CC11 | TiMo | bcc | bcc | 4 | 35 |
| CC12 | NiMo | bcc | bcc | 7 | 30 |

Cycle life of each test cell

The cycle life of each test cell was measured. The test cells were subjected to a charge-discharge cycle test, in which one cycle consisting of charge at room temperature (25° C.), and 30 mA/g for 8 hours and, after 1-hour pause, discharge at 30 mA/g to a discharge termination voltage of 1.0 V, followed by 1-hour pause. The number (times) of cycles by which the capacity decreases to 50% of the initial capacity was taken as the cycle life. The results are shown in FIG. 4 and Table 3.

Figure 4:
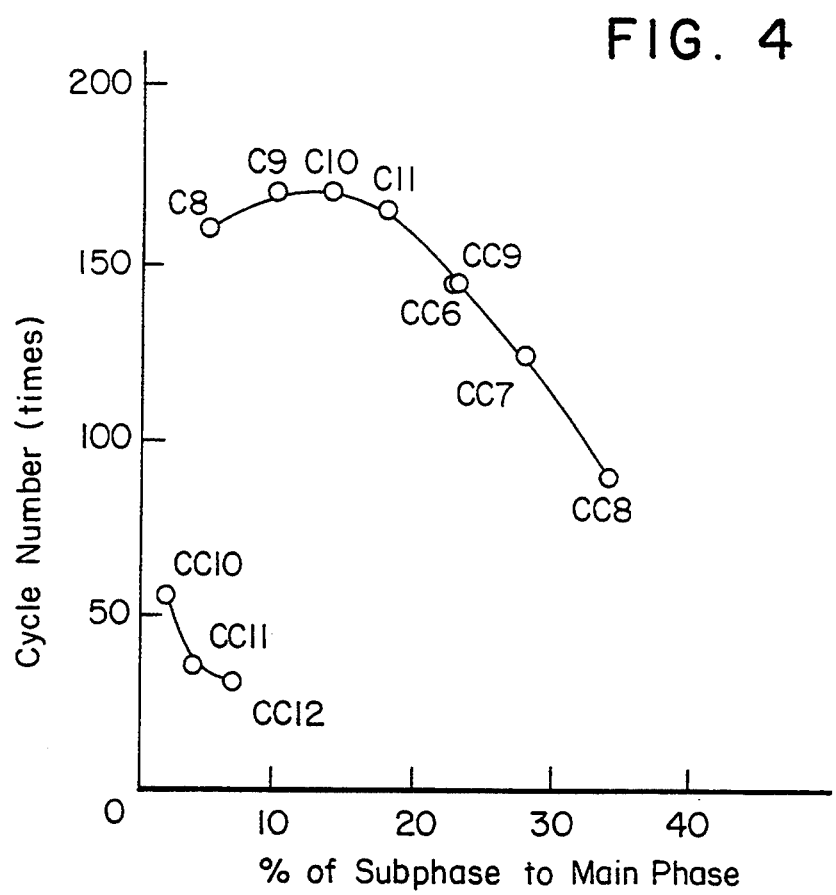
FIG. 4 is a graph showing the relationship between the ratio of the amount of subphase to that of main phase of an alloy and the cycle characteristics.

As shown in FIG. 4 and Table 3, test cells C8 through C11, using alloys having a composite phase structure comprising a main phase and a subphase(s), with the areal ratio of subphase to main phase in the alloy cross-section being 5 to 20%, have far longer cycle lives than those of comparison test cells CC6 through CC9, which, while having a composite phase structure, use alloys with the areal ratio of subphase to main phase deviating from the above range, and than those of comparison test cells CC10 through CC12 with similar composite structure but having different alloy compositions. These results show that the electrodes of the present invention (paste electrodes PE8 through PE11) hardly undergo cycle deterioration.

While explanation is made in the above Preparation Examples 8 through 11, giving examples of the electrodes of the present invention being used for negative electrodes of nickel hydride secondary batteries, the electrodes of the present invention are widely usable for metal hydride secondary batteries in general.

Besides, from the fact that comparison test cell CC12, using an NiMo alloy with an areal ratio of subpahse to main phase-in the cross-section of 7%, has a very short cycle life, it is understood that significance of restricting the areal ratio of subphase to main phase in the alloy cross-section to 5 to 20% is not applicable to hydrogen-absorbing alloys in general.

Also, while an example as a hydrogen-absorbing alloy of Ti-Mo-Ni 3-element alloy is mentioned in Preparation Examples 8 through 11, the present invention is applicable to hydrogen-absorbing alloy electrodes using electrode materials of alloys principally comprising these metals. Further in Preparation Examples 8 through 11, while an advantageous means for practicing the present invention of solidification by quenching was explained as an example, any other process is applicable insofar as it can effectively produce an alloy with the subphase-to-main phase ratio being in the range specified in the present invention.

Preparation of the electrodes (C) of the present invention and comparison electrodes

Preparation Example 12

A prescribed amount each of alloy component metals of Ti, Mo and Ni (each commercially available simple metal substance having a purity of at least 99.9%) was weighed and mixed together. The obtained mixture was placed in a copper crucible in an arc furnace with an atmosphere of an inert gas (argon) and melted by heating. The melt was then quenched by a single-roll method at a cooling rate of $1 \times 10^{3\circ}20$ C./sec, to give a hydrogen-absorbing alloy having a composition formula of $TiMo_{0.5}Ni_{0.5}$. The cross-section of the obtained hydrogen-absorbing alloy was polished and chemically etched and then observed in an SEM to measure the major axis length (a) and the major-to-minor ratio (a/b). Twenty (20) crystallites selected at random showed the values of 3.5 to 5.5 μm (average: 4.5 μm) and 1.4 to 2.5 (average: 1.9), respectively. Those values shown in the following Preparation Examples were obtained in the same manner.

An alloy paste was prepared by mixing 1 g of the hydrogen-absorbing alloy obtained above with 0.2 g of polytetrafluoroethylene (PTFE) as a binder and 1.2 g of Nickel powder as a conductive agent, and rolling the obtained mixture.

A prescribed amount each of the alloy paste was wrapped in a nickel mesh, and the wrap was pressed into a disc-shaped paste electrode PE12 having a diameter of 20 mm.

Preparation Example 13

Preparation Example 12 was repeated except that the cooling rate was changed from $1 \times 10^{3\circ}$ C./sec to $1 \times 10^{4\circ}$ C./sec, to obtain a paste electrode PE13. Crystallites constituting the main phase of the hydrogen-absorbing alloy powder used there had a major axis length (a) and major-minor minor ratio (a/b) of 1.1 to 2.0 μm (average: 1.5 μm) and 1.1 to 1.8 (average: 1.5), respectively.

Preparation Example 14

Preparation Example 12 was repeated except that the cooling rate was changed from $1 \times 10^{3\circ}$ C./sec to $1 \times 10^{5\circ}$ C./sec, to obtain a paste electrode PE14. Crystallites constituting the main phase of the hydrogen-absorbing alloy powder used there had a major axis length (a) and major-minor ratio (a/b) were 0.8 to 1.2 μm (average: 1.0 μm) and 1.1 to 1.6 (average: 1.4), respectively.

Preparation Example 15

A prescribed amount each of alloy component metals of Ti, Zr, Mo and Ni (each commercially available simple metal substance having a purity of at least 99.9%) was weighed and mixed together. The obtained mixture was placed in a copper crucible in an arc furnace with an atmosphere of an inert gas (argon) and melted by heating. The melt was then cooled by a single-roll process at a cooling rate of $1 \times 10^{3\circ}$ C./sec, to give an hydrogen-absorbing alloy having a composition formula of $Ti_{0.8}Zr_{0.2}Mo_{0.5}Ni_{0.5}$.

Crystallites constituting the main phase of the hydrogen-absorbing alloy obtained had a major axis length (a) and major-minor ratio (a/b) of 3.7 to 5.5 μm (average: 4.6 μm) and 1.2 to 3.0 (average: 2.2), respectively.

The hydrogen-absorbing alloy was used to prepare a paste electrode PE15 in the same manner as in Preparation Example 12.

Preparation Example 16

Preparation Example 15 was repeated except that the cooling rate was changed from $1 \times 10^{3\circ}$ C./sec to $1 \times 10^{5\circ}$ C./sec, to obtain a paste electrode PE16. Crystallites constituting the main phase of the hydrogen-absorbing alloy powder used there had a major axis length (a) and major-minor ratio (a/b) of 0.9 to 1.3 μm (average: 1.2 μm) and 1.1 to 1.5 (average: 1.3), respectively.

Comparative Preparation Example 13

Preparation Example 12 was repeated except that the cooling rate was changed from $1 \times 10^{3\circ}$ C./sec to $1 \times 10^{2\circ}$ C./sec, to obtain a comparison paste electrode CPE13. Crystallites constituting the main phase of the hydrogen-absorbing, alloy powder used there had a major axis length (a) and major-minor ratio (a/b) of 22 to 45 μm (average: 30 μm) and 1.6 to 3.7 (average: 3.2), respectively.

Comparative Preparation Example 14

Preparation Example 15 was repeated except that the cooling rate was changed from $1 \times 10^{3\circ}$ C./sec to $1 \times 10^{2\circ}$ C./sec, to obtain a comparison paste electrode CPE14. Crystallites constituting the main phase of the hydrogen-absorbing alloy powder used there had a major axis length (a) and major-minor ratio (a/b) of 21 to 46 μm (average: 33 μm) and 1.2 to 4.1 (average: 3.5), respectively.

Comparative Preparation Example 15

A prescribed amount each of alloy component metals of Ti, Zr and Mo (each commercially available simple metal substance having a purity of at least 99.9%) was weighed and mixed together. The obtained mixture was placed in a copper crucible in an arc furnace with an atmosphere of an inert gas (argon) and melted by heating. The melt was then cooled by a single-roll process at a cooling rate of $1 \times 10^{2\circ}$ C./sec, to give an hydrogen-absorbing alloy having a composition formula of $Ti_{0.8}Zr_{0.2}Mo$.

Crystallites constituting the main phase of the hydrogen-absorbing alloy obtained had a major axis length (a) and major-minor ratio (a/b) of 25 to 45 μm (average: 33 μm) and 1.4 to 3.9 (average: 3.2), respectively.

The hydrogen-absorbing alloy was used to prepare a comparison paste electrode CPE15 in the same manner as in Preparation Example 12.

Comparative Preparation Example 16

Comparative Preparation Example 15 was repeated except that the cooling rate was changed from $1 \times 10^{2\circ}$ C./sec to $1 \times 10^{3\circ}$ C./sec, to obtain a comparison paste electrode CPE16. Crystallites constituting the main phase of the hydrogen-absorbing alloy powder used there had a major axis length (a) and major-minor ratio (a/b) were 3.5 to 5.8 μm (average: 4.5 μm) and 1.3 to 2.7 (average: 2.0), respectively.

Comparative Preparation Example 17

Preparation Example 15 was repeated except that the cooling rate was changed from $1 \times 10^{2°}$ C./sec to $1 \times 10^{5°}$ C./sec, to obtain a comparison paste electrode CPE17. Crystallites constituting the main phase of the hydrogen-absorbing alloy powder used there had a major axis length (a) and major-minor ratio (a/b) of 1.1 to 1.5 μm (average: 1.3 μm) and 1.1 to 1.5 (average: 1.3), respectively.

Figure 5:
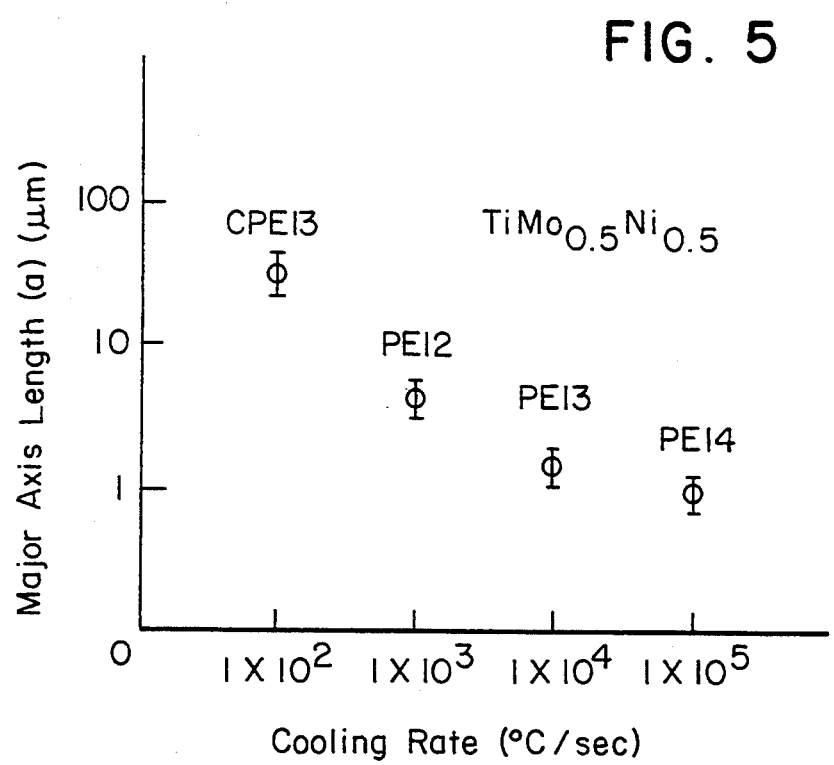
FIG. 5 is a graph showing the relationship between the cooling rate for an alloy melt and the major axis length (a) of crystallites constituting the main phase of the obtained hydrogen-absorbing alloy ($TiMo_{0.5}Ni_{0.5}$)
Figure 6:
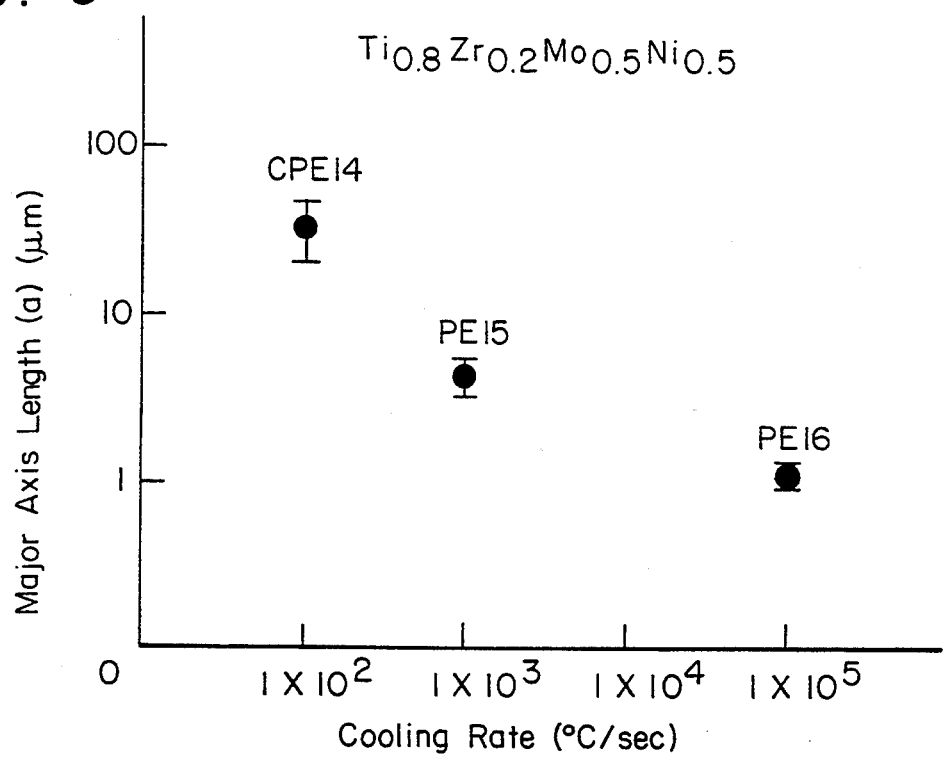
FIG. 6 is a graph showing the relationship between the cooling rate for an alloy melt and the major axis length (a) of crystallites constituting the main phase of the obtained hydrogen-absorbing alloy ($Ti_{0.8}Zr_{0.2}Mo_{0.5}Ni_{0.5}$)
Figure 7:
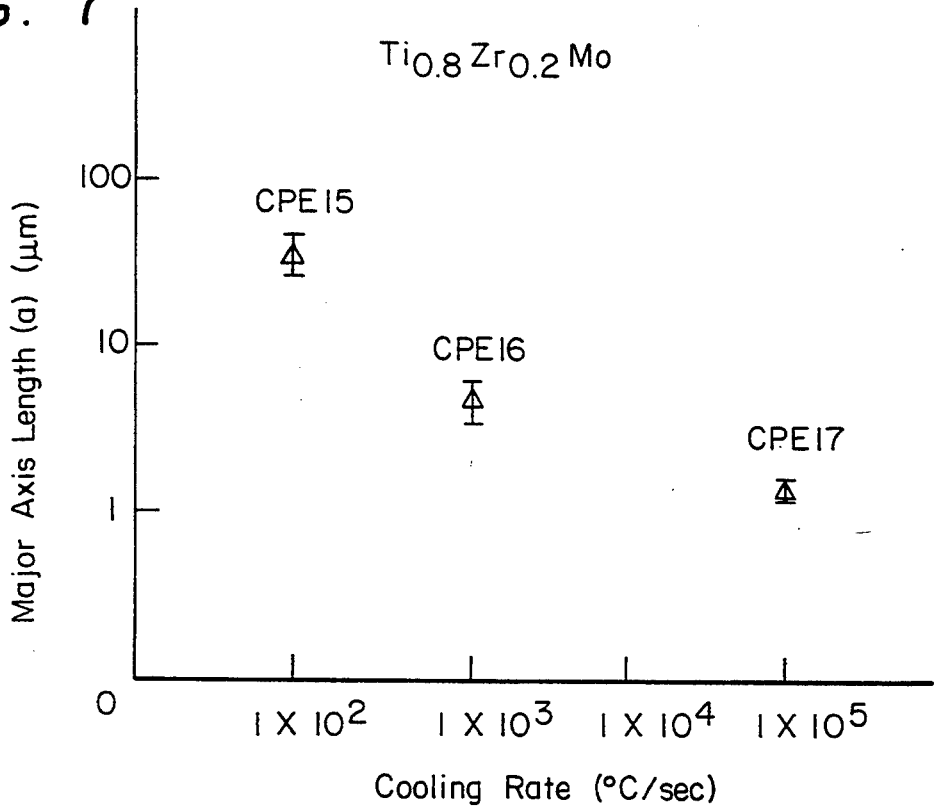
FIG. 7 is a graph showing the relationship between the cooling rate for an alloy melt and the major axis length (a) of crystallites constituting the main phase of the obtained hydrogen-absorbing alloy ($Ti_{0.8}Zr_{0.2}Mo$)

FIG. 5 through FIG. 7 are graphs separately showing, by alloy types, the relationship between the cooling rate for alloy melt and the major axis length crystallites constituting the main phase of the obtained hydrogen-absorbing alloy. In the graphs, the ordinate represents the major axis length (a) in μm and the abscissa the cooling rate (° C./sec). It is understood from these graphs that the major axis length (a) shortens and its diversion (distribution) decreases with increasing cooling rate, regardless of alloy type.

Figure 8:
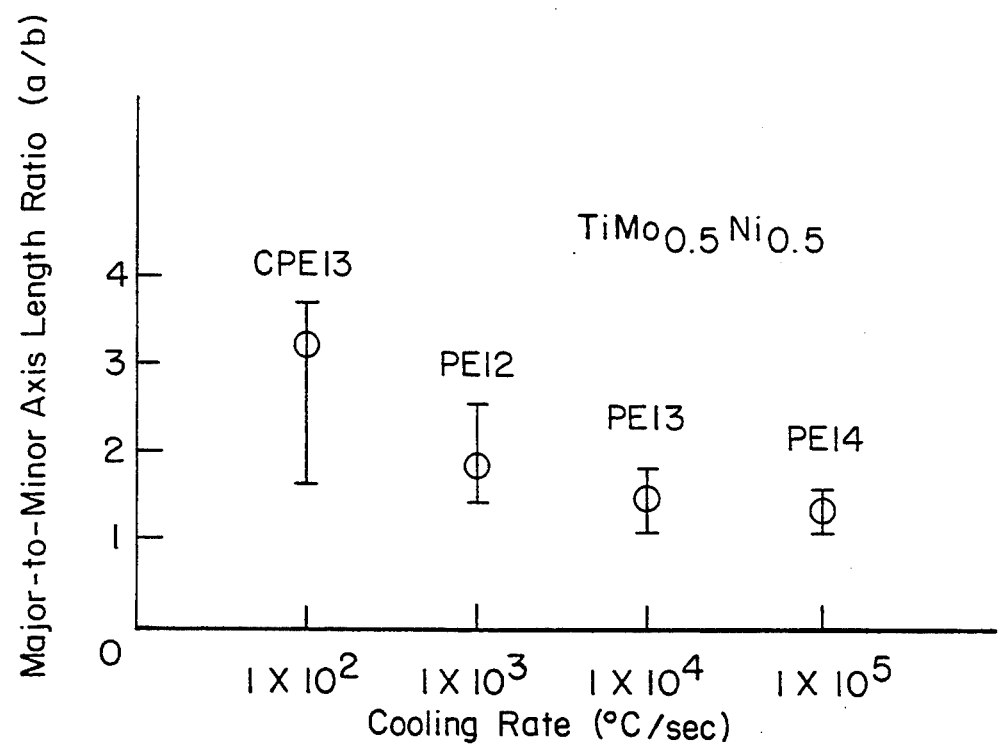
FIG. 8 is a graph showing the relationship between the cooling rate for an alloy melt and the major axis length-to-minor axis length (a/b) of crystallites constituting the main phase of the obtained hydrogen-absorbing alloy ($TiMo_{0.5}Ni_{0.5}$)
Figure 9:
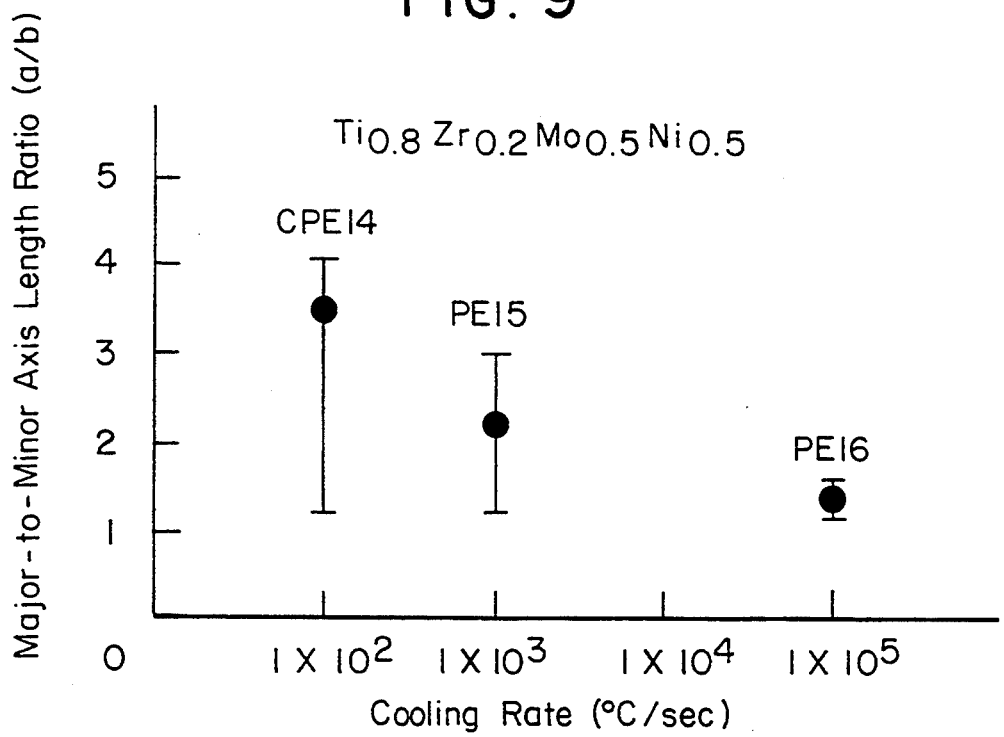
FIG. 9 is a graph showing the relationship between the cooling rate for an alloy melt and the major axis length-to-minor axis length (a/b) of crystallites constituting the main phase of the obtained hydrogen-absorbing alloy ($Ti_{0.8}Zr_{0.2}Mo_{0.5}Ni_{0.5}$)
Figure 10:
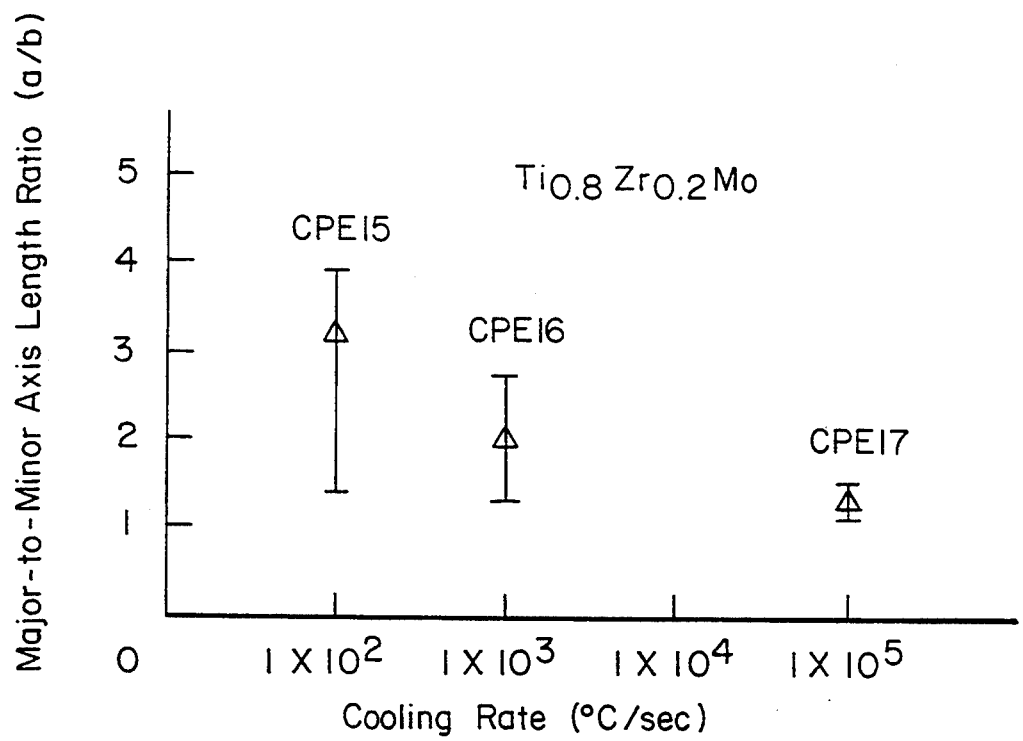
FIG. 10 is a graph showing the relationship between the cooling rate for an alloy melt and the major axis length-to-minor axis length (a/b) of crystallites constituting the main phase of the obtained hydrogen-absorbing alloy ($Ti_{0.8}Zr_{0.2}Mo$)

FIG. 8 through FIG. 10 are graphs separately showing, by alloy types, the relationship between the cooling rate for alloy melt and the major-to-minor axis length ratio of crystallites constituting the main phase of the obtained hydrogen-absorbing alloy. In the graphs, the ordinate represents the major-to-minor ratio (a/b) and the abscissa the cooling rate (° C./sec). It is understood from these graphs that the major-to-minor ratio (a/b) and its diversion (distribution) both decrease with increasing cooling rate, regardless of alloy type. In FIGS. 5 through 10, positions on the ordinate for ○, ● and △ show the major axis length (a) or the major-to-minor ratio (a/b) that are averages of measurements on 20 specimens.

Fabrication of test cells

The above paste electrodes PE12 through PE16 and the comparison paste electrodes CPE13 through CPE17 were used and test cells C12 through C16 and comparison test cells CC13 through CC17 were prepared correspondingly.

Cycle life of each test cell

The cycle life of each test cell was measured. The test cells were subjected to a charge-discharge cycle test, in which one cycle consisting of charge at room temperature (25° C.) and 30 mA/g for 8 hours and, after 1-hour pause, discharge at 30 mA/g to a discharge termination voltage of 1.0 V, followed by 1-hour pause.

Figure 11:
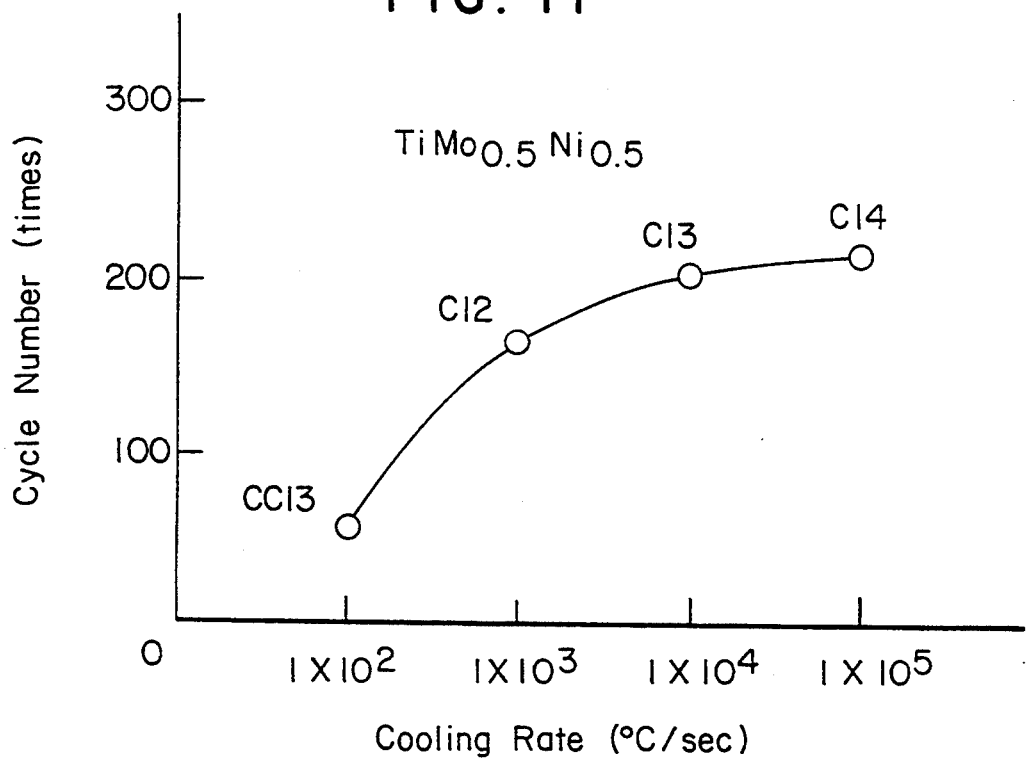
FIG. 11 is a graph showing the relationship between the cooling rate for alloy melt and the cycle characteristics.
Figure 12:
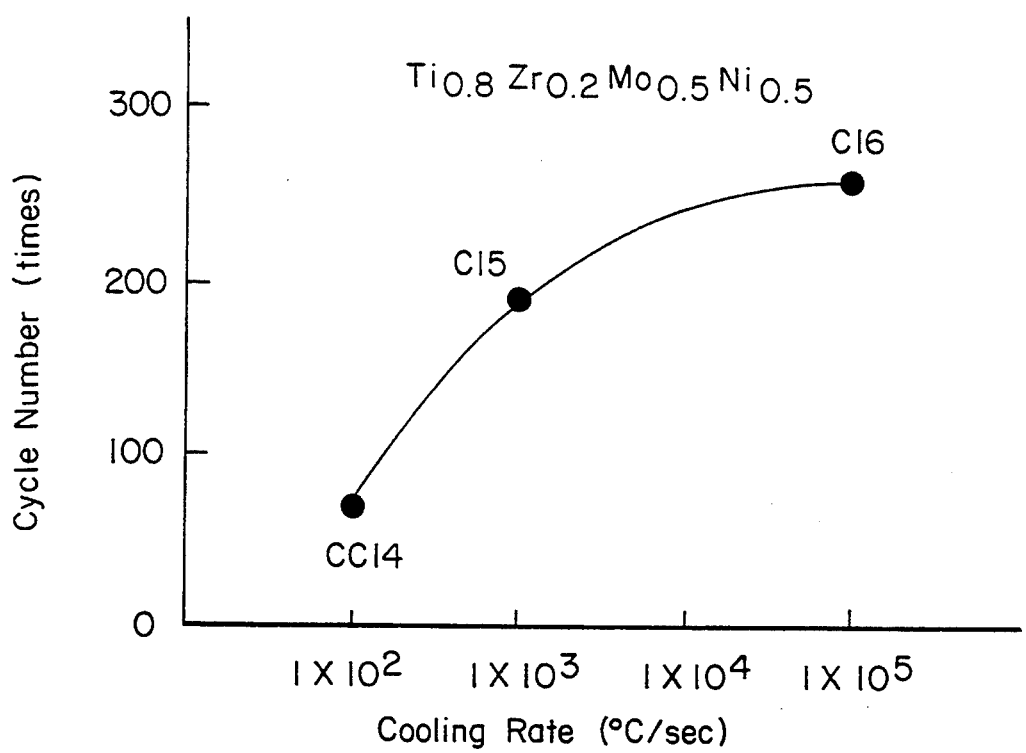
FIG. 12 is a graph showing the relationship between the cooling rate for alloy melt and the cycle characteristics.
Figure 13:
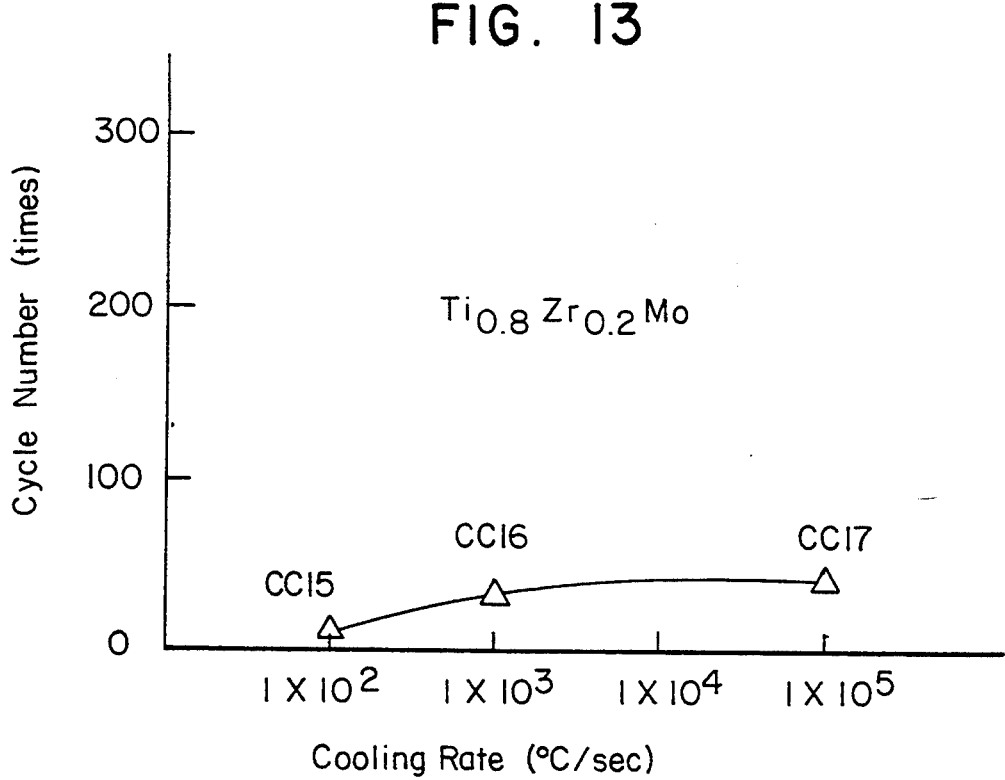
FIG. 13 is a graph showing the relationship between the cooling rate for alloy melt and the cycle characteristics.

FIG. 11 through 13 are graphs showing the cycle lives of test cells, with the ordinate representing the cycle number (times) and the abscissa the cooling rate (°C./sec). As shown in FIGS. 11 and 12, test cells C12 through C16, using Ti-Mo-Ni or Ti-Zr-Mo-Ni hydrogen-absorbing alloys obtained by solidification by quenching at a cooling rate of at least $1 \times 10^{3°}$ C./sec and comprising crystallites having a major axis length (a) of 0.8 to 6 μm and a major-to-minor ratio (a/b) of not more than 3 have longer cycle lives than those of comparison test cells CC13 and CC14, using a Ti-Mo-Ni 3-element alloy and a Ti-Zr-Mo-Ni 4-element alloy respectively which comprised crystallites having a major axis length (a) and a major to-minor ratio each deviating from the above range. These results show that the electrodes of the present invention are more resistant to cycle deterioration compared with conventional hydrogen-absorbing alloy electrodes utilizing an alloy of the same composition.

Besides, as is apparent from Table 3 given before, the above restrictions for the major axis length (a) and the major-to-minor ratio (a/b) are effective also when a hydride layer is formed on the surface of the hydrogen-absorbing alloy.

Further as shown in FIG. 13, from the fact that comparison test cells CC16 and CC17, using Ti-Zr-Mo alloys with the major axis ratio (a) and the major-to-minor ratio (a/b) each being within the range specified in the present invention have short cycle lives, it is understood that significance of restricting the major axis length and the major-to-minor ratio is not applicable to hydrogen-absorbing alloys in general.

While explanation is made in the above Preparation Examples 12 through 16, giving examples of the electrodes of the present invention being used for negative electrodes of nickel hydride secondary batteries, the electrodes of the present invention are widely usable for negative electrodes of metal hydride secondary batteries in general.

Obviously, numerous modifications and variations of the present invention are possible in light of the above teachings. It is therefore to be understood that within the scope of the appended claims, the invention may be practiced otherwise than as specifically described herein.

What is claimed is:

1. A hydrogen-absorbing alloy electrode containing an electrode material of a hydrogen-absorbing alloy having a body-centered cubic structure represented by the general formula $AB_x$ wherein:

A consists essentially of Ti, or A is a mixture of elements that consists essentially of Ti in combination with Zr, Hf, Nb or Ta, and wherein A generates heat upon absorption of hydrogen, B consists essentially of Mo and Ni, or B is a mixture of elements that consists essentially of Mo and Ni in combination with Cr, W, Co or Cu, and wherein B absorbs heat upon absorption of hydrogen and $0.5 \leq X \leq 2$, said alloy being obtained by quenching and solidifying an alloy melt under an atmosphere of a reducing gas containing hydrogen at a cooling rate of at least $1 \times 10^{3°}$ C./sec and having on the surface thereof a hydride layer.

2. The hydrogen-absorbing alloy electrode according to claim 1, wherein said hydride layer has an average thickness of 0.01 to 3 μm.

3. The hydrogen-absorbing alloy electrode according to either claim 1 or claim 2, wherein said hydrogen-absorbing alloy is in the form of flakes obtained by solidification by quenching by rolling and having an average thickness of not more than 30 μm.

4. A hydrogen-absorbing alloy electrode containing an electrode material of a hydrogen-absorbing alloy having a body-centered cubic structure represented by the general formula $AB_x$ wherein:

A consists essentially of Ti, or A is a mixture of elements that consists essentially of Ti in combination with Zr, Nf, Nb or Ta, and wherein A generates heat upon absorption of hydrogen, B consists essentially of Mo and Ni, or B is a mixture of elements that consists essentially of Mo and Ni in combination with Cr, W, Co or Cu, and wherein B absorbs heat upon absorption of hydrogen and $0.5 \leq X \leq 2$, said alloy having a composite phase structure comprising a main phase and a sub-phase, the average areal ratio of said sub-phase to said main phase in any cross-section of said alloy being 5 to 20%.

5. A hydrogen-absorbing alloy electrode containing an electrode material of a hydrogen-absorbing alloy having a body-centered cubic structure represented by the general formula $AB_x$ wherein:
- A consists essentially of Ti, or A is a mixture of elements that consists essentially of Ti in combination with Zr, Hf, Nb or Ta, and wherein A generates heat upon absorption of hydrogen,
- B consists essentially of Mo and Ni, or B is a mixture of elements that consists essentially of Mo and Ni in combination with Cr, W, Co or Cu, and wherein B absorbs heat upon absorption of hydrogen and $0.5 \leq X\, 2$,
- said alloy having a composite phase structure comprising a main phase and a sub-phase, said main phase comprising crystallites having a major axis length (a) of 0.8 to 6 μm and a ratio of the major axis length (a) to minor axis length (b), a/b, of not more than 3.

6. The hydrogen-absorbing alloy electrode according to claim 5, wherein said hydrogen-absorbing alloy is obtained by solidification of an alloy melt by quenching at a cooling rate of at least $1 \times 10^{3}$° C./sec.

7. The hydrogen-absorbing alloy electrode according to claim 1, wherein A consists essentially of Ti, and B consists essentially of Mo and Ni.

8. The hydrogen-absorbing alloy electrode according to claim 4, wherein A consists essentially of Ti, and B consists essentially of Mo and Ni.

9. The hydrogen-absorbing alloy electrode according to claim 5, wherein A consists essentially of Ti, and B consists essentially of Mo and Ni.

10. The hydrogen-absorbing alloy electrode according to claim 1, wherein A consists essentially of Ti in combination with Zr, Hf, Nb or Ta.

11. The hydrogen-absorbing alloy electrode according to claim 4, wherein A consists essentially of Ti in combination with Zr, Hf, Nb or Ta.

12. The hydrogen-absorbing alloy electrode according to claim 5, wherein A consists essentially of Ti in combination with Zr, Hf, Nb or Ta.

13. The hydrogen-absorbing alloy electrode according to claim 1, wherein B consists essentially of Mo and Ni in combination with Cr, W, Co or Cu.

14. The hydrogen-absorbing alloy electrode according to claim 4, wherein B consists essentially of Mo and Ni in combination with Cr, W, Co or Cu.

15. The hydrogen-absorbing alloy electrode according to claim 5, wherein B consists essentially of Mo and Ni in combination with Cr, W, Co Cu.

16. The hydrogen-absorbing alloy electrode according to claim 1, wherein A consists essentially of Ti in combination with Zr, Hf, Nb or Ta and wherein B consists essentially of Mo and Ni in combination with Cr, W, Co or Cu.

17. The hydrogen absorbing alloy electrode according to claim 4, wherein A consists essentially of Ti in combination with Zr, Hf, Nb or Ta and wherein B consists essentially of Mo and Ni in combination with Cr, W, Co or Cu.

18. The hydrogen absorbing alloy electrode according to claim 5, wherein A consists essentially of Ti in combination with Zr, Hf, Nb or Ta and wherein B consists essentially of Mo and Ni in combination with Cr, W, Co or Cu.

* * * * *